United States Patent
Roberts et al.

(10) Patent No.: US 9,582,136 B2
(45) Date of Patent: Feb. 28, 2017

(54) SYSTEMS AND METHODS FOR DETERMINING AND PRESENTING TOP-RANKED MEDIA PROGRAMS OF A MEDIA SERVICE THAT DISTRIBUTES MEDIA PROGRAMS BY WAY OF A PLURALITY OF DIFFERENT MEDIA DISTRIBUTION MODELS

(71) Applicant: Verizon and Redbox Digital Entertainment Services, LLC, Basking Ridge, NJ (US)

(72) Inventors: Brian F. Roberts, Dallas, TX (US); Imran Arif Maskatia, Palo Alto, CA (US); Paul Bradley Bowers, Winfield, IL (US)

(73) Assignee: Verizon and Redbox Digital Entertainment Services, LLC, Basking Ridge, NJ (US)

( * ) Notice: Subject to any disclaimer, the term of this patent is extended or adjusted under 35 U.S.C. 154(b) by 145 days.

(21) Appl. No.: 14/069,206

(22) Filed: Oct. 31, 2013

(65) Prior Publication Data

US 2014/0157328 A1  Jun. 5, 2014

Related U.S. Application Data

(60) Provisional application No. 61/732,247, filed on Nov. 30, 2012.

(51) Int. Cl.
*H04N 5/445* (2011.01)
*G06F 3/0481* (2013.01)
(Continued)

(52) U.S. Cl.
CPC .......... *G06F 3/0481* (2013.01); *G06F 3/0482* (2013.01); *G06Q 30/02* (2013.01); *G06Q 30/0607* (2013.01); *G06Q 30/0609* (2013.01); *H04L 67/10* (2013.01); *H04N 21/218* (2013.01); *H04N 21/2543* (2013.01);
(Continued)

(58) Field of Classification Search
CPC .................................................. H04N 21/4622
See application file for complete search history.

(56) References Cited

U.S. PATENT DOCUMENTS 7,703,116 B1 *  4/2010  Moreau et al. .................. 725/45
7,793,326 B2 *  9/2010  McCoskey et al. ............ 725/91
(Continued)

*Primary Examiner* — Fernando Alcon

(57) ABSTRACT

An exemplary method includes a media service provider system 1) generating, based on a first set of most-accessed media programs of a first media distribution model of a media service and a second set of most-accessed media programs of a second media distribution model of the media service, data representative of a merged set of most-accessed media programs that includes at least one media program from the first set of most-accessed media programs and at least one media program from the second set of most-accessed media programs and 2) providing, for display, user interface content representing the merged set of most-accessed media programs. In the method, the first media distribution model includes a digital media distribution model that utilizes a digital media distribution channel, and the second media distribution model includes a physical media distribution model that utilizes a physical media distribution channel.

16 Claims, 10 Drawing Sheets

(51) Int. Cl.
*H04L 29/08* (2006.01)
*G06F 3/0482* (2013.01)
*H04N 21/4722* (2011.01)
*H04N 21/472* (2011.01)
*H04N 21/218* (2011.01)
*H04N 21/482* (2011.01)
*H04N 21/27* (2011.01)
*G06Q 30/02* (2012.01)
*G06Q 30/06* (2012.01)
*H04N 21/2543* (2011.01)
*H04N 21/488* (2011.01)

(52) U.S. Cl.
CPC ........... *H04N 21/27* (2013.01); *H04N 21/472* (2013.01); *H04N 21/4722* (2013.01); *H04N 21/47202* (2013.01); *H04N 21/47214* (2013.01); *H04N 21/482* (2013.01); *H04N 21/4882* (2013.01)

(56) References Cited

U.S. PATENT DOCUMENTS

| | | | |
|---|---|---|---|
| 8,028,233 B1* | 9/2011 | Florschuetz et al. | 715/716 |
| 8,584,165 B1* | 11/2013 | Kane et al. | 725/44 |
| 8,627,379 B2* | 1/2014 | Kokenos et al. | 725/60 |
| 8,761,585 B2* | 6/2014 | Barton | G11B 27/105 386/230 |
| 9,179,171 B2* | 11/2015 | Ren | H04N 21/2541 |
| 2004/0117831 A1* | 6/2004 | Ellis et al. | 725/53 |
| 2006/0155575 A1* | 7/2006 | Gross | 705/1 |
| 2007/0136322 A1* | 6/2007 | Cormack | H04N 5/44543 |
| 2007/0157248 A1* | 7/2007 | Ellis | H04N 5/445 725/47 |
| 2009/0249412 A1* | 10/2009 | Bhogal et al. | 725/104 |
| 2011/0194839 A1* | 8/2011 | Gebert et al. | 386/290 |
| 2011/0214148 A1* | 9/2011 | Gossweiler et al. | 725/46 |
| 2012/0233640 A1* | 9/2012 | Odryna et al. | 725/45 |
| 2013/0263185 A1* | 10/2013 | Wood et al. | 725/56 |
| 2014/0123179 A1* | 5/2014 | Wang | 725/37 |

\* cited by examiner

800

MOVIES | TV SHOWS | GAMES

Search Movies, TV Shows & Games 🔍

Find a location | ▼  🛒 Cart ❷

◄Back

Cover Art

PREVIEW

Captain America: The First Avenger

[PG-13] [HD] [SD] [DVD] [Blu-ray] [2:05] [SUBSCRIBED] [cc]

Genres: Action, Adventure, Sci-Fi & Fantasy
Starring: Chris Evans, Hugo Weaving
Director: Joe Johnston
Studio: Marvel
Subtitles: English, French, Spanish
Format: Widescreen ★★☆☆☆ 2.0 average rating ─804

842 ratings | 498 reviews | Write a review

Ready to 'Watch Now' with subscription ( INSTANT OPTIONS ▼ )   ( AT KIOSK ▼ )

SYNOPSIS
Horrified by newsreel footage of the Nazis in Europe, Steve Rogers is inspired to enlist in the army. Because of his frailty and sickness, Rogers is rejected but later offered the opportunity to take part in a special experiment called Operation: Rebirth. A...

More Like This

Cover Art | Cover Art  ─802

Fig. 8

SYSTEMS AND METHODS FOR DETERMINING AND PRESENTING TOP-RANKED MEDIA PROGRAMS OF A MEDIA SERVICE THAT DISTRIBUTES MEDIA PROGRAMS BY WAY OF A PLURALITY OF DIFFERENT MEDIA DISTRIBUTION MODELS

RELATED APPLICATIONS

The present application claims priority under 35 U.S.C. §119(e) to U.S. Provisional Patent Application No. 61/732,247, filed Nov. 30, 2012. The contents of the provisional patent application are hereby incorporated by reference in their entirety.

BACKGROUND INFORMATION

There are diverse ways for people to find and consume media programs. For example, a person wanting to watch a movie may utilize a traditional video distribution service such as a video rental or purchase service ("video service") to find, access, and watch a movie. The video service may allow the person to rent or purchase a physical copy of the movie from a local video store or video vending kiosk, or to rent or purchase a digital copy of the movie through an online video service, which may stream or download the digital copy of the movie to a user computing device for playback to the user.

Such a video service typically provides a user of the service with tools for discovering video programs offered for access through the video service. While a conventional video service provides useful tools for discovery of the video programs offered by the service, there remains room for new and/or improved tools that may further benefit users and/or a provider of the service. For example, there remains room to improve tools for identifying and promoting popular video programs to better assist a user of the service in conveniently discovering information about and/or accessing popular video programs and/or other video programs that may be of interest to the user.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIGS. 5-8 illustrate exemplary media service user interface views according to principles described herein.

DETAILED DESCRIPTION OF PREFERRED EMBODIMENTS

Exemplary systems and methods for determining and presenting top-ranked media programs of a media service that distributes media programs by way of a plurality of different media distribution models are described herein. The systems and methods described herein may facilitate convenient and/or otherwise helpful user discovery of top-ranked media programs. In certain examples, for instance, the systems and methods described herein may determine top-ranked media programs based on user access of media programs across multiple different media distribution models by way of which media programs are accessed by end users of the media service. The systems and methods may then present user interface content representing the top-ranked media programs in a media service user interface in a manner that is configured to promote the top-ranked media programs and/or facilitate user discovery of the top-ranked media programs.

For example, in an exemplary method, a media service provider system may 1) generate, based on a first set of top-ranked media programs of a first media distribution model of a media service and a second set of top-ranked media programs of a second media distribution model of the media service, data representative of a merged set of top-ranked media programs that includes at least one media program from the first set of top-ranked media programs and at least one media program from the second set of top-ranked media programs and 2) provide, for display on a display screen, user interface content representing the merged set of top-ranked media programs.

The systems and methods described herein may benefit end users and/or a provider of a media service. For example, one or more of the features described herein may enhance user experiences with discovery of top-ranked media programs of the media service. Exemplary systems and methods for determining and presenting top-ranked media programs of a media service that distributes media programs by way of a plurality of different media distribution models will now be described in reference to the accompanying drawings.

Figure 1:
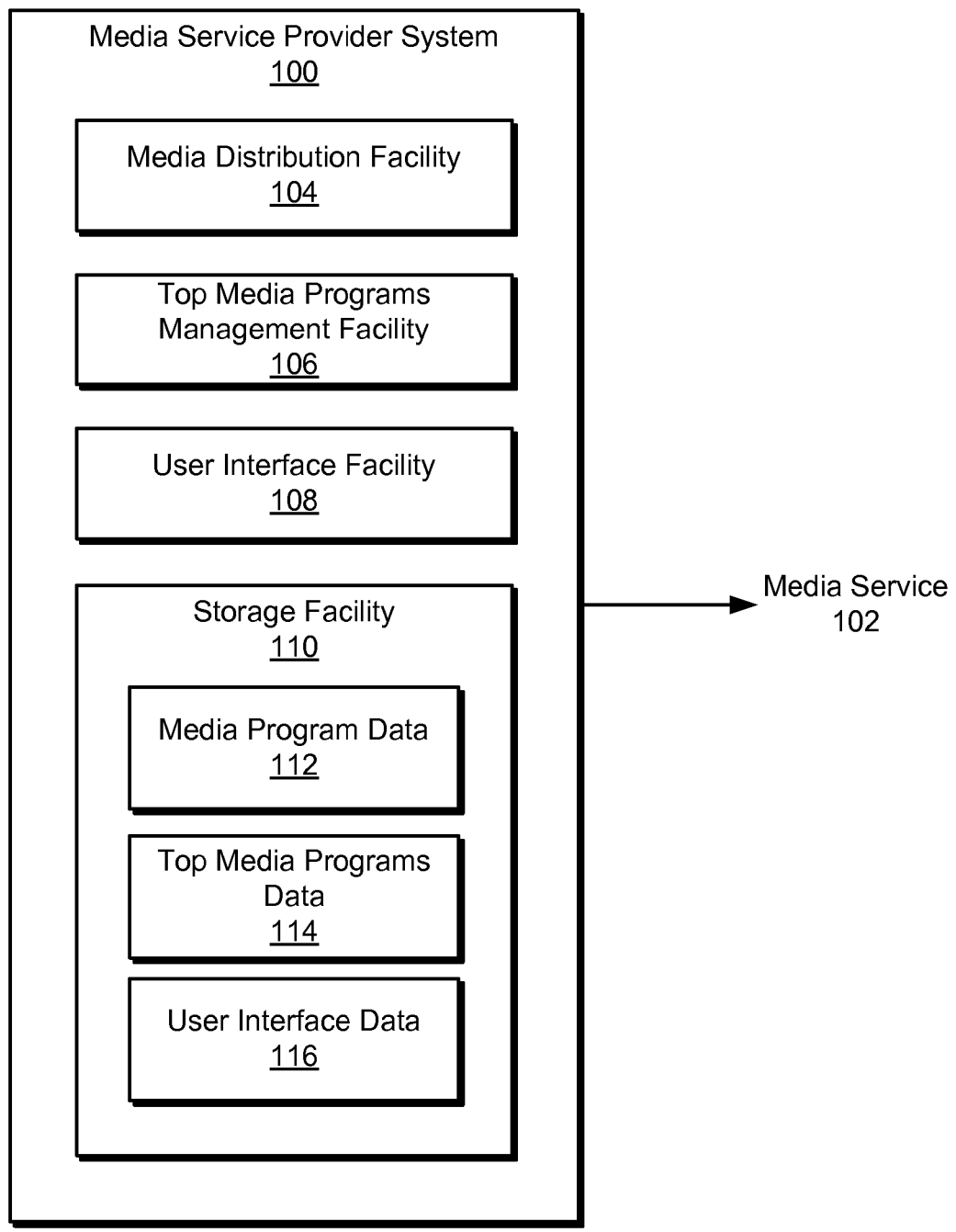
FIG. 1 illustrates an exemplary media service provider system according to principles described herein.

FIG. 1 illustrates an exemplary media service provider system 100 ("system 100"). System 100 may be configured to facilitate discovery, access, and/or consumption of media programs by one or more users. For example, system 100 may be configured to provide a media service 102 (e.g., a media program distribution service) to one or more end users of the media service 102 (e.g., one or more subscribers to the media service 102). System 100 may be associated with (e.g., operated by) a provider of the media service 102 ("service provider"). Through the media service 102, an end user of the media service may discover, access, and/or consume media programs distributed by system 100.

In certain examples, the media service 102 may be an integrated media service 102 at least because the media service 102 distributes media programs by way of multiple different media distribution models, thus providing an end user of the media service 102 with access to media programs by way of multiple different media distribution models.

Examples of media distribution models associated with the media service 102 are described herein.

As used herein, the term "media program" may refer to any discrete instance of media content that may be distributed by the media service 102 for consumption by an end user of the media service 102. For example, a media program may refer to any television program, on-demand media program, pay-per-view media program, broadcast media program (e.g., broadcast television program), multicast media program (e.g., multicast television program), narrowcast media program (e.g., narrowcast video-on-demand program), Internet Protocol television ('IPTV") media program, advertisement, video, movie, audio program, radio program, video game, or any other media program that a user may access by way of the media service 102. Such media programs that are made available for user consumption by way of the media service 102 may be accessed and/or played back by an appropriately configured user computing device (e.g., a media player device) for presentation to the user.

As shown in FIG. 1, system 100 may include, without limitation, a media distribution facility 104 ("distribution facility 104"), a top media programs management facility 106 ("management facility 106"), a user interface facility 108, and a storage facility 110 selectively and communicatively coupled to one another. The facilities may be communicatively coupled one to another by any suitable communication technologies.

It will be recognized that although facilities 104-110 are shown to be separate facilities in FIG. 1, any of those facilities may be combined into a single facility or split into additional facilities as may serve a particular implementation. Additionally or alternatively, one or more of the facilities 104-110 may be omitted from and external to system 100 in other implementations. Facilities 104-110 will now be described in more detail.

Storage facility 110 may be configured to store media program data 112 representative of media programs that may be distributed by distribution facility 104, top media programs data 114 representative of information about top-ranked media programs of the media service 102, and user interface data 116 generated and/or used by user interface facility 108 to provide one or more user interfaces for use by end users of the media service 102 to discover, access, and/or consume the media programs, such as described herein. Storage facility 110 may maintain additional or alternative data as may serve a particular implementation.

Distribution facility 104 may be configured to distribute media programs to users of the media service 102. Distribution facility 104 may be configured to distribute media programs in any way and/or form that is suitable to facilitate consumption of the media programs by users of the media service 102.

In certain examples, distribution facility 104 may be configured to distribute media programs by way of multiple different media program distribution channels. For example, distribution facility 104 may be configured to distribute media programs by way of a digital media distribution channel and a physical media distribution channel. The digital media distribution channel may include on-demand streaming and/or downloading of data representative of the media programs from a media service provider server system to one or more user computing systems by way of a network (e.g., an Internet Protocol ("IP") wide area network such as the Internet). The physical media distribution channel may include distribution of physical media that hold data representative of the media programs. For example, the physical media distribution channel may include a media vending kiosk-based distribution channel through which physical media, such as digital versatile discs ("DVDs"), BLU-RAY discs, and/or other physical computer-readable copies of media programs are distributed to users of the media service 102.

Figure 2:
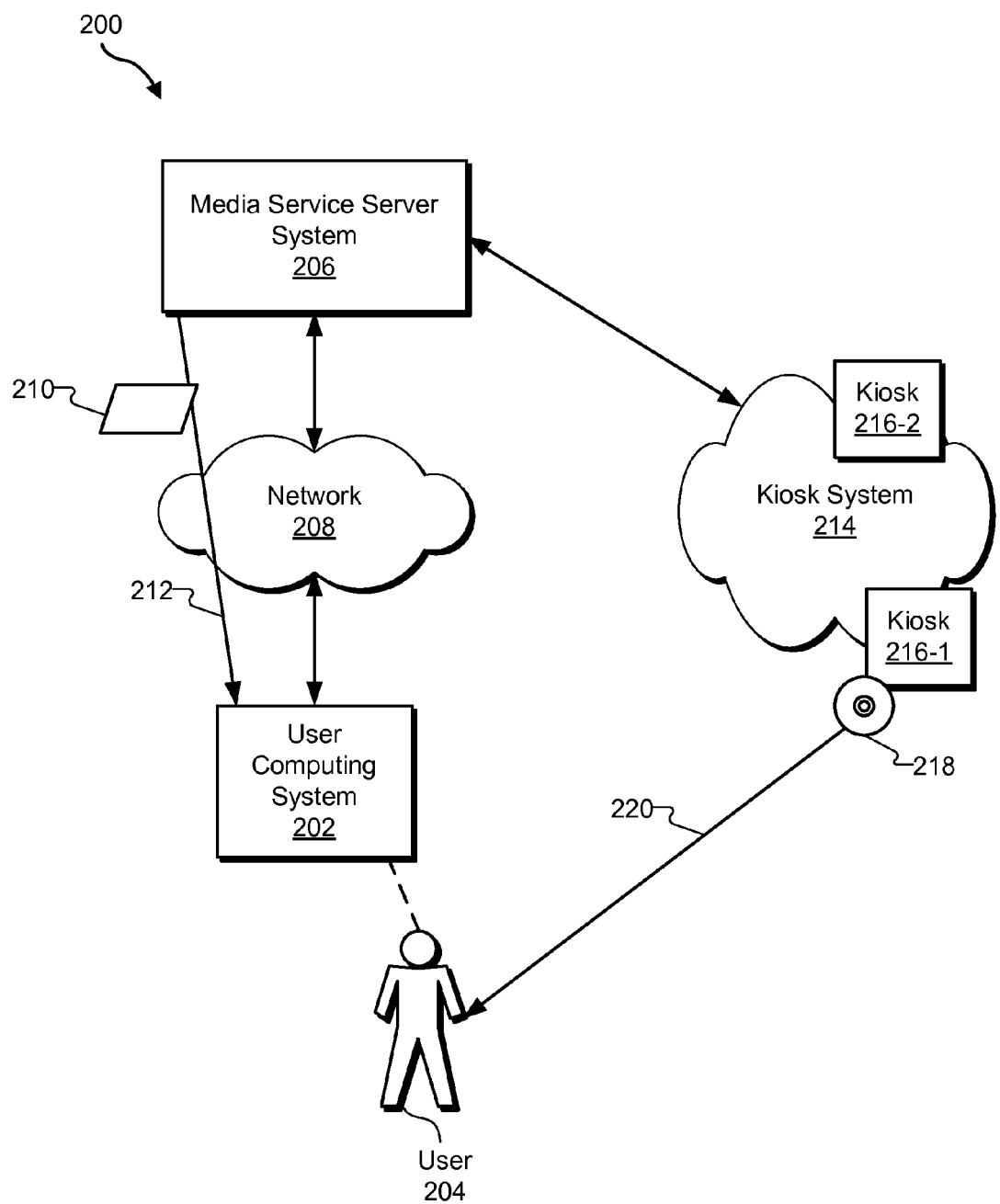
FIG. 2 illustrates an exemplary media programs distribution configuration according to principles described herein.

FIG. 2 illustrates an exemplary media programs distribution configuration 200 ("configuration 200") in which system 100 is implemented. Components of system 100 may be implemented by one or more of the elements of the configuration 200 shown in FIG. 2. As shown, the configuration 200 may include a user computing system 202 associated with a user 204, who may be an end user of the media service 102. User computing system 202 may be in communication with a media service server system 206 ("server system 206"), which may include one or more computing devices (e.g., server devices) remotely located from user computing system 202 and/or operated by a provider of the media service 102.

User computing system 202 and server system 206 may communicate using any communication platforms and technologies suitable for transporting data (e.g., media program data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, wireless communication technologies, Internet communication technologies, media streaming technologies, media download technologies, and other suitable communications technologies.

In certain embodiments, user computing system 202 and server system 206 may communicate via a network 208. Network 208 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between user computing system 202 and server system 206. Communications between user computing system 202 and server system 206 may be transported using any one of the above-listed networks, or any combination or sub-combination of the above-listed networks. Alternatively, user computing system 202 and server system 206 may communicate in another way such as by direct connections between user computing system 202 and server system 206.

The configuration 200 may support distribution of media programs, through the media service 102, by way of multiple different media distribution channels, such as a digital media distribution channel and a physical media distribution channel. As shown, server system 206 may distribute media programs such as digital data 210 representative of a media program to user computing system 202 by way of a digital media distribution channel 212. This distribution may utilize any suitable media streaming and/or downloading technologies (e.g., Internet media streaming and/or downloading technologies) to support delivery of digital data representative of media programs to user computing system 202 by way of network 208.

As further shown in FIG. 2, server system 206 may be in communication with a media vending kiosk system 214, which may include one or more geographically distributed vending kiosks 216 (e.g., vending kiosks 216-1 and 216-2) configured to vend physical copies of media programs, such as a physical copy 218 of a media program, to user 204 by way of a physical media distribution channel 220. For example, user 204 may visit a location of media vending kiosk 216-1 and obtain the physical copy 218 of the media program from the media vending kiosk 216-1. In certain examples, one or more of the vending kiosks 216 may include automated media vending machines.

The user computing system 202 may be configured for use by the user 204 to access the media service 102 provided by system 100. For example, the user 204 may utilize the user computing system 202 to access one or more user interfaces provided by system 100 as part of the media service 102, and to present the user interfaces for use by the user 204 to discover, access, and/or consume media programs distributed by way of the digital media distribution channel 212 and/or the physical media distribution channel 220 as part of the media service 102.

The user computing system 202 may include one or more user computing devices associated with the user 204. Examples of such devices include, without limitation, a media player computing device (e.g., a media disc player device such as a DVD or BLU-RAY disc player device), a display device, a set-top box device, a digital video recording ("DVR") device, a computer, a tablet computer, a smart phone device, a gaming console, and any other device capable of accessing the media service 102 and/or media programs provided by system 100 by way of the media service 102.

In certain examples, the user computing system 202 may include a first user computing device (e.g., a primary display device) configured to play back media programs and a second user computing device (e.g., a secondary or companion display device) configured to display a graphical user interface that may compliment or be used together with the playback of the media programs by the first user computing device. For instance, a television may provide a primary display screen on which a video program may be displayed, and a tablet computer may provide a secondary display screen on which a graphical user interface (e.g., a graphical user interface related to the video program, the playback of the video program, and/or the media service 102) may be displayed. Such an example is illustrative only. Other examples of user computing system 202 may include any combination of user computing devices or a single user computing device configured to perform any of the user computing system and/or device operations described herein.

Returning to FIG. 1, in certain examples, distribution facility 104 may be configured to provide users of the media service 102 with access to media programs by way of a plurality of different media distribution models ("distribution models"). Each distribution model may define a particular way that an end user of the media service 102 may gain access to media programs through the media service 102. Thus, a user of the media service 102 may be able to gain access to media programs by way of multiple different distribution models.

In certain examples, the distribution models may include multiple distribution channel-based models such as a digital media distribution model that corresponds to a digital media distribution channel and a physical media distribution model that corresponds to a physical media distribution channel. For example, a digital media programs distribution model may include and/or utilize the digital media distribution channel 212 of FIG. 2, and a physical media distribution model may include or utilize the physical media distribution channel 220 of FIG. 2.

Additionally or alternatively, the distribution models may include different compensation-based models for gaining access to media programs. For example, the distribution models may include one or more subscription-based distribution models and one or more transactional-based distribution models. A subscription-based distribution model may be defined by a service provider to provide a user with access to certain media programs based on a subscription of the user to the media service 102 (e.g., a monthly-fee subscription, a temporary free-trial subscription, or another defined subscription). A transactional-based distribution model may be defined by a service provider to provide a user with access to certain media programs based on discrete transactions dedicated to accessing specific media programs. For example, access to a media program may be provided in exchange for a fee dedicated to a rental or a purchase of the media program. The conditions of the access may be defined to be different for a rental and a purchase of the media program, in which case each of the rental and the purchase may be a different transactional-based distribution model (e.g., a media rental distribution model and a media purchase distribution model).

In certain examples, the distribution models may include different models that are combinations of channel-based distribution models and compensation-based distribution models. For example, the different models may include one or more of a subscription-based and digital channel-based distribution model, a transactional-based and digital channel-based distribution model, a subscription-based and physical channel-based distribution model, and a transactional-based and physical channel-based distribution model.

In certain examples, the distribution models may include media-format-based distribution models for gaining access to media programs in specific media formats. For example, the media distribution facility 102 may be configured to distribute media programs in a plurality of media formats, such as a high definition ("HD") media format, a standard definition ("SD") media format, a BLU-RAY disc media format, and a DVD media format, each of which may be a different media-format-based distribution model.

In certain examples, media-format-based distribution models may be associated with specific media distribution channels. For example, the HD and SD media formats may be associated with a digital media distribution channel and/or a physical media distribution channel, and the BLU-RAY disc and DVD media formats may be associated with a physical media distribution channel.

Distribution facility 104 may be configured to provide users of the media service 102 with access to media programs by way of any of the different distribution models described herein, or by way of any combination or sub-combination thereof. In certain implementations, distribution facility 104 may distribute media programs by way of multiple digital subscription sets, which may include different subscription packages providing different levels of access to media programs (e.g., one subscription package may provide subscription access to SD media programs but not HD media programs and another subscription package may provide subscription access to both SD and HD media programs. In certain implementations, distribution facility 104 may distribute media programs by way of multiple digital transactional sets, which may include transactional access by rental and/or purchase to different sets of media programs (e.g., SD and/or HD media programs).

Figure 3:
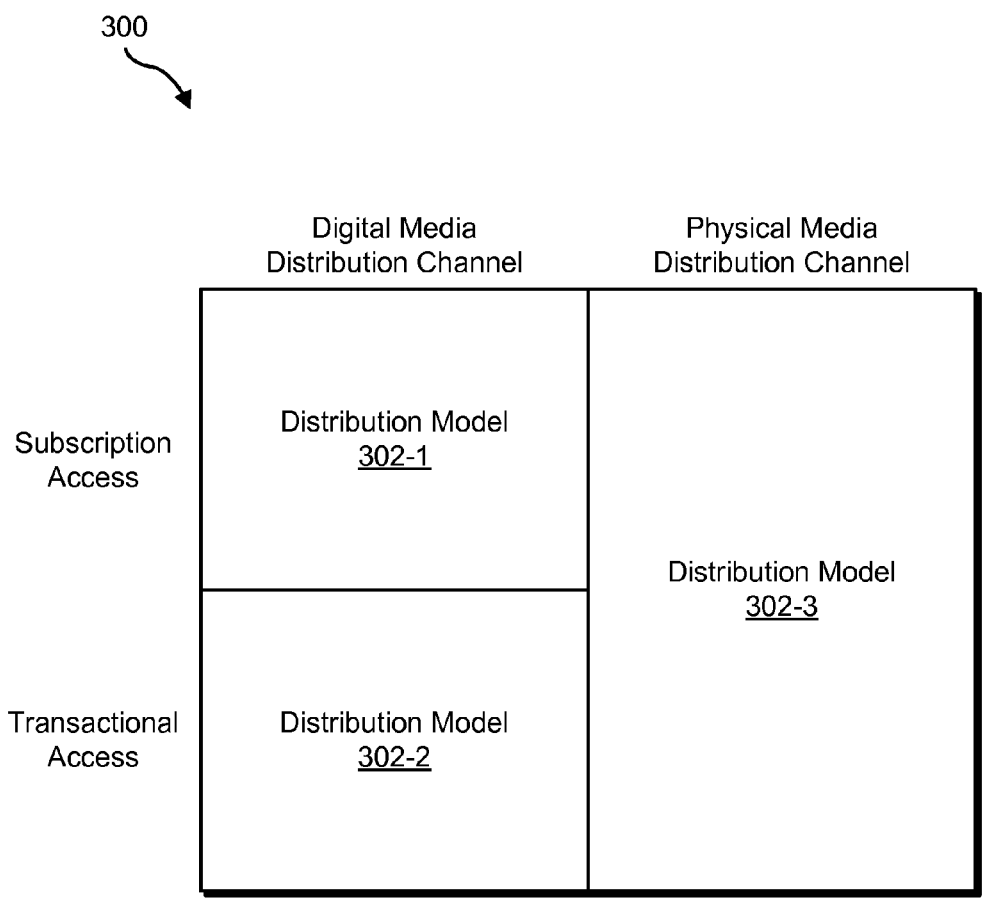
FIG. 3 illustrates a table representing an exemplary set of different media distribution models by way of which access to media programs may be provided by way of a media service according to principles described herein.

FIG. 3 illustrates a table 300 representing an exemplary set of different distribution models by way of which access to media programs may be provided through the media service 102 in certain implementations. As shown, the set of distribution models includes a first distribution model 302-1 associated with subscription-based access to media programs by way of a digital media distribution channel, a second distribution model 302-2 associated with transactional-based access to media programs by way of the digital media distribution channel, and a third distribution model 302-3 associated with either or both subscription-based or transactional-based access to media programs by way of a physical media distribution channel. In certain examples, these distribution models 302 may be referred to as a "subscription" digital distribution model 302-1, an "on-demand" or "rent/buy" digital distribution model 302-2, and a "physical" or "kiosk" distribution model 302-3.

Media programs distributed by distribution facility 104 as part of the media service 102 may be assigned to one or more of the distribution models provided by distribution facility 104. For example, certain media programs may be made available by way of all of the distribution models and certain media programs may be made available by way of only a subset of the distribution models (e.g., by way of only a subscription-based and digital channel-based distribution model, only a transactional-based and digital channel-based distribution model, only a physical channel-based distribution model, only a transactional-based distribution model, etc.).

In certain examples, assignments of media programs to distribution models may change over time. For example, for a first period of time, a media program may be distributed by way of distribution model 302-3 only. At the end of that period of time, the media program may leave distribution model 302-3, meaning that the media program is no longer accessible by way of distribution model 302-3. For a second period of time, however, the same media program may be distributed by way of distribution model 302-2 only. For example, when the media program leaves distribution model 302-3, the media program may be added to distribution model 302-2. At the end of the second period of time, the same media program may leave distribution model 302-2 and be assigned to distribution model 302-1. This example is illustrative only, a media program may be made accessible by way of different distribution models or specific combinations of distribution models for specific periods of time, and may be added to or removed from any distribution model in any suitable way.

Distribution facility 104 may maintain and/or otherwise have access to data representing relationships between media programs and distribution models by way of which the media programs are distributed. Such data may indicate to which distribution models the media programs are assigned and periods of time for the assignments (e.g., periods of time during which media programs are assigned to the distribution models). This data may be maintained in any suitable way, including in distinct source catalogues respectively associated with the distribution models, in an integrated catalogue associated with all of the distribution models (e.g., an integrated catalogue that includes an aggregation of non-redundant data included in the source catalogues), or a combination of such source catalogues and an integrated catalogue.

Returning again to FIG. 1, system 100 may be configured to perform one or more operations configured to promote and/or facilitate user discovery of top-ranked media programs of the media service 102. The discovery may include discovery of information and/or user interface content about top-ranked media programs, including user interface content indicating that the media programs are top-ranked media programs of the media service 102.

To this end, management facility 106 may be configured to determine top-ranked media programs in any suitable way, including by accessing data representative of top-ranked media programs from any suitable source and/or accessing and processing other data (e.g., media program metadata, statistical data, ratings data, etc.) to identify top-ranked media programs within a group of media programs. Top-ranked media programs may be determined by ranking media programs relative to one another based on any suitable ranking factors. For example, media programs may be ranked based on the number of user accesses of media programs (e.g., number of user accesses through the media service 102 during a predetermined period of time). A user access may be defined by a media service provider to include any specific accesses of media programs by users, such as rentals, purchases, streaming accesses, downloads, views, playbacks, etc. A user access may be defined to be a unique access per user, per media program, and/or per user access device. In examples in which media programs are ranked based on number of accesses of media programs, top-ranked media programs may include and/or be referred to as "most-accessed" media programs. As another example, media programs may be ranked based on ratings of media programs. Any suitable ratings may be used, such as critic ratings, media service user ratings, community ratings, social network user ratings, etc. A ranking factor may be used alone or in combination with one or more other ranking factors to rank media programs relative to one another.

In certain examples, management facility 106 may be configured to determine a set of top-ranked media programs for each of a plurality of media distribution models of the media service 102. Such a set of top-ranked media programs that is specific to a particular media distribution model may be referred to as a "model-specific" set of top-ranked media programs. Any ranking factors may be used. For example, management facility 106 may determine a set of top-ranked media programs for a particular media distribution model of the media service 102 based on user access (e.g., number of accesses) of media programs by way of the media distribution model.

Management facility 106 may be configured to determine a model-specific set of top-ranked media programs in any suitable way. In certain examples, management facility 106 may generate the model-specific set of top-ranked media programs based on data representative of statistics of user accesses of media programs by way of a particular distribution model. Management facility 106 may access such statistical data from any suitable source (e.g., from distribution facility 104, server system 206, kiosk system 214, or another source internal or external of system 100). In other examples, management facility 106 may be configured to determine a model-specific set of top-ranked media programs by accessing data representative of an already-defined model-specific set of top-ranked media programs from any suitable source (e.g., from distribution facility 104, server system 206, kiosk system 214, or another source internal or external of system 100).

Management facility 106 may be configured to determine a model-specific set of top-ranked media programs periodically, in real-time, and/or in response to a predefined event. For example, management facility 106 may be configured to determine a model-specific set of top-ranked media programs on a daily basis, a weekly basis, when data representative of access statistics or the model-specific set of top-ranked media programs becomes available from a source, or at any other suitable time.

Management facility 106 may determine, based on model-specific sets of top-ranked media programs, a merged set of top-ranked media programs that includes at least one media program selected from each of the model-specific sets of top-ranked media programs. Accordingly, the merged set of top-ranked media programs may be a blended set of top-ranked media programs that includes media programs that are selected for inclusion in the merged set of top-ranked media programs based on rankings of the media programs within each of the media distribution models of the media service 102.

Figure 4:
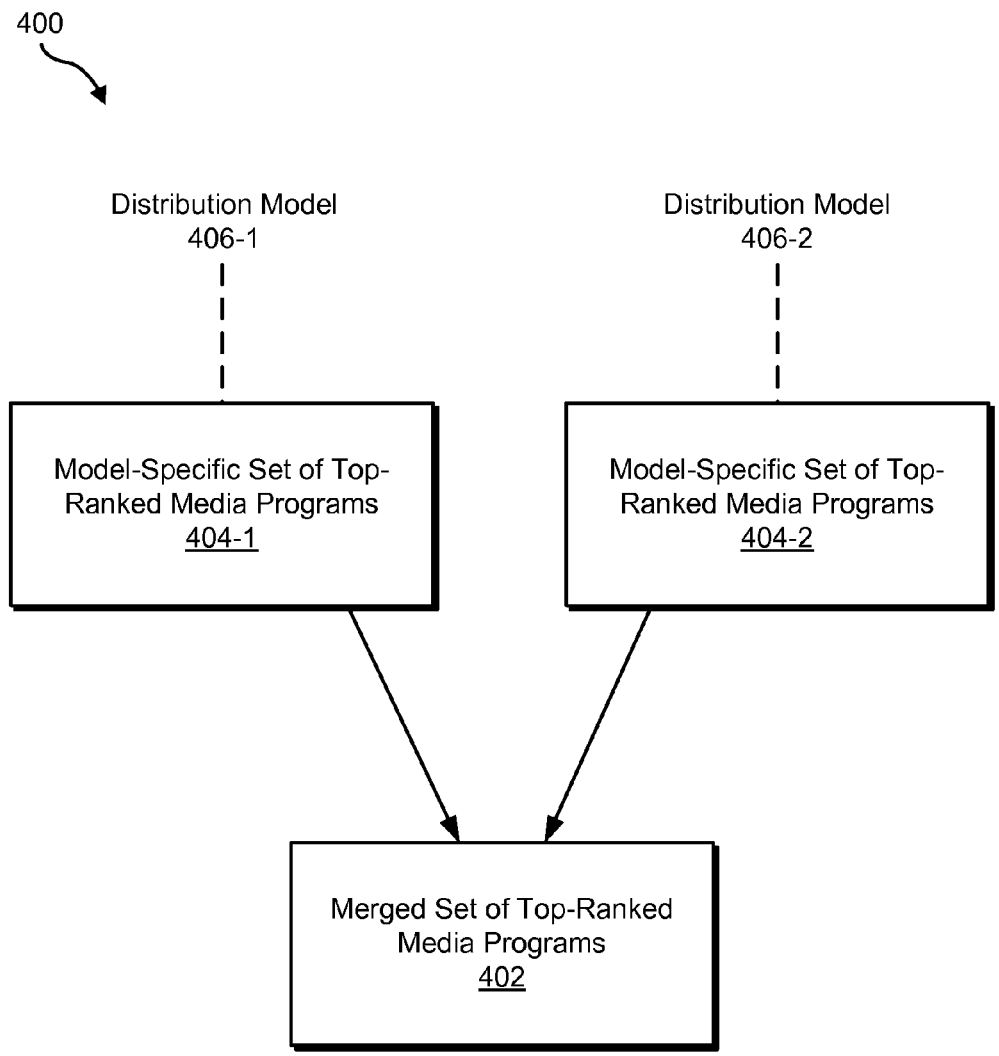
FIG. 4 illustrates an exemplary configuration in which a merged set of top-ranked media programs is generated based on multiple sets of top-ranked media programs for multiple different media distribution models according to principles described herein.

To illustrate, FIG. 4 shows an exemplary configuration 400 in which a merged set of top-ranked media programs 402 is generated based on multiple model-specific sets of top-ranked media programs 404 (e.g., sets 404-1 and 404-2) for multiple different media distribution models 406 (e.g., distribution models 406-1 and 406-2). In configuration 400, a first model-specific set of top-ranked media programs 404-1 represents one or more top-ranked media programs within a first media distribution model 406-1 (e.g., a number of the most accessed media programs within the first media distribution model 406-1), which may include any of the distribution models described herein. Configuration 400 further includes a second model-specific set of top-ranked media programs 404-2 that represents one or more top-ranked media programs within a second distribution model 406-2 (e.g., a number of the most accessed media programs within the second distribution model 406-2), which may include any other of the distribution models described herein.

As an example, the first model-specific set of top-ranked media programs 404-1 may represent one or more most-accessed media programs within media programs that are accessed by way of a digital media distribution model that includes or utilizes a digital media distribution channel (e.g., a subscription or transactional digital media distribution model), and the second model-specific set of top-ranked media programs 404-2 may represent one or more most-accessed media programs within media programs that are accessed by way of a physical media distribution model that includes or utilizes a physical media distribution channel (e.g., a kiosk distribution model). As another example, the first model-specific set of top-ranked media programs 404-1 may represent one or more most accessed media programs within media programs accessed by users by way of a first digital media distribution model (e.g., a subscription model), and the second model-specific set of top-ranked media programs 404-2 may represent one or more most accessed media programs within media programs accessed by users by way of a second digital media distribution model (e.g., a transactional model).

Based on the model-specific sets of top-ranked media programs 404, management facility 106 may determine the merged set of top-ranked media programs 402. For example, management facility 106 may generate data representative of the merged set of media programs 402 based on model-specific sets of top-ranked media programs 404.

Management facility 106 may be configured to generate the merged set of media programs 402 in any way suitable for generating a blended set of media programs 402 from the model-specific sets of top-ranked media programs 404. In certain examples, management facility 106 may generate the merged set of media programs 402 from the model-specific sets of top-ranked media programs 404 based on a predefined merge heuristic that specifies how the model-specific sets of top-ranked media programs 404 are to be merged. The merge heuristic may specify one or more merge conditions for use by management facility 106 to determine how to merge the model-specific sets of top-ranked media programs 404. For example, based on the merge conditions, management facility 106 may determine which how to select, combine, and/or sort media programs included in the model-specific sets of top-ranked media programs 404 to form the merged set of top-ranked media programs 402. The merge conditions may specify that media programs are to be selected, combined, and/or sorted in any suitable order of operation and/or based on any suitable merge factors. Examples of merge factors include, without limitation, media program release dates, access rankings (e.g., by number of user accesses as described herein), community ratings, user ratings, media distribution model types, and any other media program attribute.

In certain examples, the merge heuristic may specify that the model-specific sets of top-ranked media programs 404 are to be comprehensively merged such that the merged set of top-ranked media programs 402 is a superset of the model-specific sets of top-ranked media programs 404. In such examples, management facility 106 may comprehensively merge the model-specific sets of top-ranked media programs 404 to form the merged set of top-ranked media programs 402.

In other examples, the merge heuristic may specify that the model-specific sets of top-ranked media programs 404 are to be non-comprehensively merged such that the merged set of top-ranked media programs 402 is a subset of the superset of the model-specific sets of top-ranked media programs 404. In such examples, management facility 106 may non-comprehensively merge the model-specific sets of top-ranked media programs 404 to form the merged set of top-ranked media programs 402.

As an example of a non-comprehensive merge, management facility 106 may select a subset of the media programs included in the first model-specific set of top-ranked media programs 404-1 and a subset of the media programs included in the second model-specific set of top-ranked media programs 404-2 based on one or more merge conditions, combine the selected subsets of media programs into a merged set of media programs, and sort the media programs within the merged set of media programs based on one or more merge conditions (e.g., from newest to oldest based on release date). As another example of a non-comprehensive merge, management facility 106 may combine the first model-specific set of top-ranked media programs 404-1 and the second model-specific set of top-ranked media programs 404-2 together into a combined set of media programs, select a subset of the media programs from the combined set of media programs based on one or more merge factors, and sort the media programs in the subset of media programs based on one or more merge factors to form the merged set of top-ranked media programs 402 (e.g., from newest to oldest based on release date). Management facility 106 may non-comprehensively merge the model-specific sets of top-ranked media programs 404 to form the merged set of top-ranked media programs 402 in other suitable ways in other examples.

The merge factors may be defined by a media service provider for use by management facility 106 to select and/or sort media programs based on one or more attributes of the media programs, which may result in prioritization of top-ranked media programs having a certain attribute or certain attributes over other top-ranked media programs for inclusion in the merged set of top-ranked media programs. For example, a merging performed by management facility 106 based on merge factors may prioritize, for inclusion in the merged set of top-ranked media programs 402, top-ranked media programs that are ranked higher than other top-ranked media programs, that have more recent release dates than other top-ranked media programs, that are distributed by way of a particular media distribution model, that are top-ranked within a particular media distribution model, and/or that have any other attribute.

In certain examples, a merging performed by management facility 106 may include performance of one or more compensation operations configured to compensate for differences between rankings of media programs within different media distribution models. Such operations and/or difference may be specified by the merge heuristic. In certain examples, the compensation operations may include normalizing ranking measures to facilitate comparison of normalized rankings across the model-specific sets of top-ranked media programs 404.

As an example, a media service provider may decide that a user access (e.g., a rental) of a physical copy of a media program by way of a physical media distribution model has more value than a user access (e.g., a rental) of a digital copy of a media program by way of a digital media distribution model (or vice verse in other examples). The media service provider may define the merge heuristic to more heavily weight user accesses of physical copies of media programs by way of the physical media distribution model as compared to user accesses of digital copies of media programs by way of the digital media distribution model. Accordingly, in a merge, management facility 106 may give more weight to the physical copy accesses than to the digital copy accesses, as directed by the merge heuristic, when merging the model-specific sets of top-ranked media programs 404 to form the merged set of top-ranked media programs 402.

Management facility 106 may be configured to perform any of the operations described above within any suitable context, such as within a context of a media service user interface and/or a context determined by user input in a media service user interface. As an example, management facility 106 may be configured to determine one or more sets of top-ranked media programs within the context of one or more media program filters. For instance, management facility 106 may determine one or more sets of top-ranked media programs within the context of a media program category applied as a filter.

To illustrate, in certain examples, management facility 106 may apply a media program category as a filter when generating the merged set of top-ranked media programs 402. In such examples, management facility 106 may select media programs that are associated with the media program category from the model-specific sets of top-ranked media programs 404 for use in generating the merged set of top-ranked media programs 402.

As another example, management facility 106 may be configured to determine one or more sets of top-ranked media programs within the context of a particular media program. For instance, management facility 106 may determine one or more sets of top-ranked media programs within the context of a media program applied as a filter. To illustrate, management facility 106 may apply a media program as a filter when generating the merged set of top-ranked media programs 402, such as by selecting media programs that each have one or more attributes shared by the media program from the model-specific sets of top-ranked media programs 404 for use in generating the merged set of top-ranked media programs 402.

These examples of context are illustrative only. Management facility 106 may be configured to determine one or more sets of top-ranked media programs within any suitable context.

While certain examples described herein are described with reference to the model-specific sets of top-ranked media programs 404 shown in FIG. 4 and FIG. 4 illustrates two model-specific sets of top-ranked media programs 404, this is illustrative only. Management facility 106 may determine the merged set of media programs 402 based on two or more model-specific sets of top-ranked media programs 404 associated with two or more media distribution models 406.

Returning again to FIG. 1, system 100 may present user interface content representing a set of top-ranked media programs in a media service user interface in a manner that is configured to promote the top-ranked media programs and/or facilitate user discovery of the top-ranked media programs. This may include system 100 providing, for display on a display screen, user interface content representing a merged set of top-ranked media programs. The user interface content may be provided for display within a media service graphical user interface view, including any of the exemplary graphical user interface views illustrated herein.

User interface facility 108 may be configured to provide a media service user interface through which a user (e.g., user 204) may interface with the media service 102 to discover, access, and/or consume media content. The user interface may be in any suitable form. For example, user interface facility 108 may be configured to provide a website, a client application user interface (e.g., a user interface provided by a client application such as a "mobile app" installed and running on the user computing system 202), a media player user interface, a graphical user interface, and/or any other form of user interface configured to facilitate user interaction with the media service 102. Accordingly, the user 204 may utilize the user computing system 202 to access a user interface provided by user interface facility 108 in order to interact with the media service 102 to discover, access, and/or consume media content distributed as part of the media service 102.

User interface facility 108 may be configured to provide user interface content representing a merged set of top-ranked media programs for inclusion in a media service user interface, such as by populating the media service user interface with the user interface content representing the merged set of top-ranked media programs. This may include populating a section of a media service user interface, such as a section of a media service user interface view, with the user interface content. Such a section may be designated for promotion of top-ranked media programs of the media service 102.

Examples of media service graphical user interface ("GUI") views that include user interface content representing top-ranked media programs and that may be provided by user interface facility 108 for display on a display screen are illustrated in FIGS. 5-8. In the illustrated examples, the user interface content may represent a set of top-ranked media programs as determined by management facility 106. Accordingly, user interface facility 108 may access data representative a set of top-ranked media programs from management facility 106 and use the data to generate a media service GUI view. In certain examples, each of the GUI views illustrated in FIGS. 5-8 may represent a different context (e.g., filter context, user interface context, etc.) within which a set of top-ranked media programs may be determined and presented.

Figure 5:
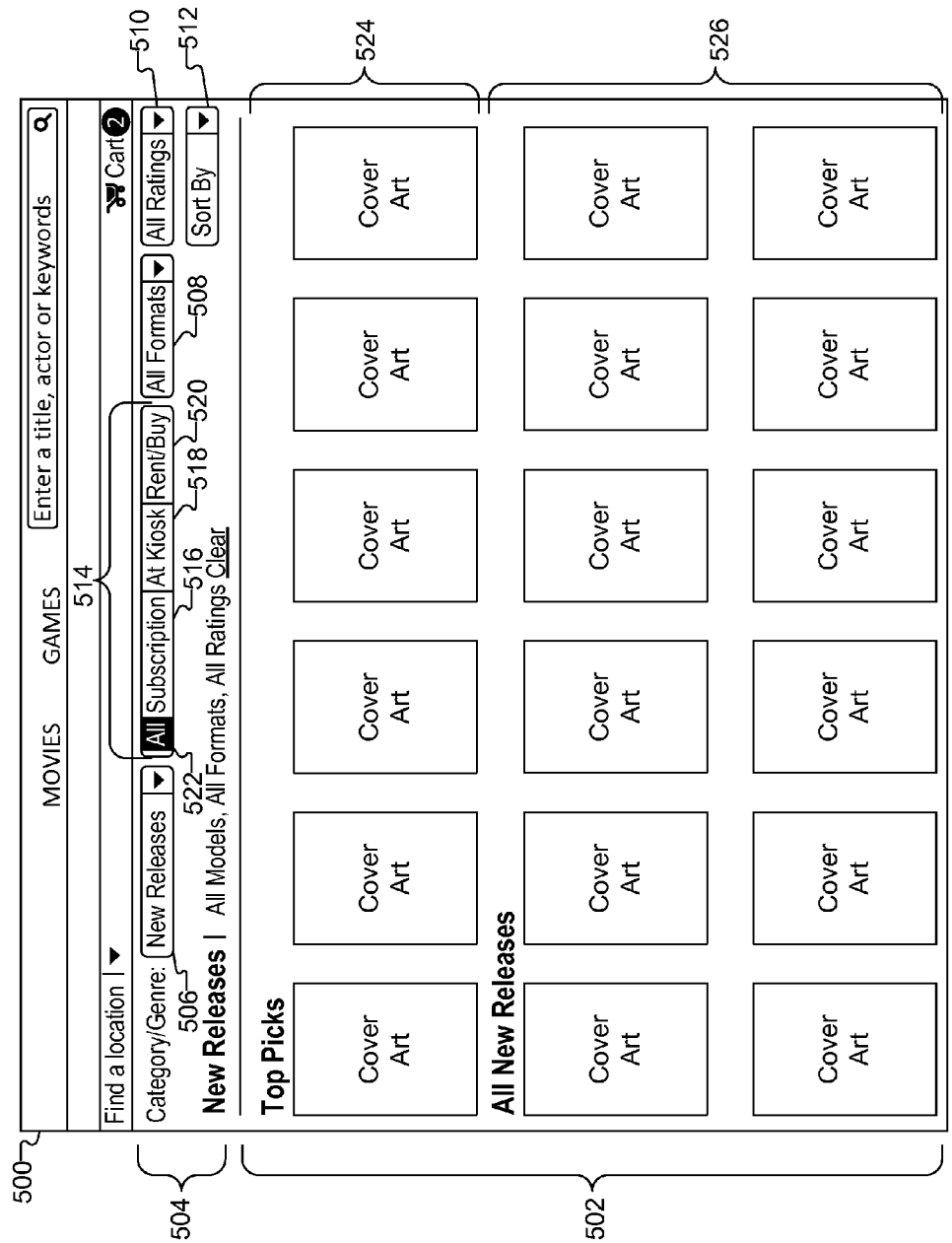

FIG. 5 illustrates a media browse view 500 ("browse view 500") of a media service user interface as may be displayed on a display screen. When browse view 500 is displayed, a user may browse for media programs, such as by providing input to navigate browse content displayed in a browse area 502 of browse view 500. As shown, the browse content may include a grid of images (e.g., cover art images) that represent media programs available for access through the media service 102.

Browse view 500 may further include a filter area 504 that includes one or more tools for filtering the browse content displayed in browse area 502. As shown, filter area 504 may include a media program category selection tool 506 for use by a user to select a particular category of media programs to be represented in browse area 502, a format selection tool 508 for use by a user to select a particular media format (e.g., HD, SD, DVD, BLU-RAY, etc.) of media programs to be represented in browse area 502, a rating selection tool 510 for use by a user to select a particular rating (e.g., a Motion Picture Association of America ("MPAA") rating such as G, PG, PG-13, or R rating) of media programs to be represented in browse area 502, and a sort tool 512 for use by a user to sort the media programs represented in browse area 502 by a particular sorting condition.

Filter area 504 may further include a distribution model filter tool 514 (e.g., a filter bar) for use by a user to select a distribution model of media programs to be represented in browse area 502. Filter tool 514 may include a plurality of user-selectable options corresponding to different media distribution models. As shown, filter tool 514 may include a user-selectable option 516 configured to be selected by a user to filter the browse content in browse area 502 to represent only media programs that are accessible by way of a subscription-based distribution model, a user-selectable option 518 configured to be selected by a user to filter the browse content in browse area 502 to represent only media programs that are accessible by way of a physical vending kiosk-based distribution model, and a user-selectable option 520 configured to be selected by a user to filter the browse content in browse area 502 to represent only media programs that are accessible by way of a transactional-based distribution model.

Filter tool 514 may also include a user-selectable option 522 configured to be selected by a user to remove any of filters 516, 518, and 520 such that the browse content in browse area 502 is not filtered by a specific distribution model. That is, when option 522 is selected, browse content in browse panel 102 may depict media programs accessible through the media service 102 by way of any of the distribution models. In FIG. 5, option 522 is selected and the browse content in browse panel 102 depicts media programs accessible by way of any of the distribution models.

As shown, browse area 502 of browse view 500 may be divided into multiple sections including a top-ranked media programs section 524 labeled "Top Picks" and an all-inclusive section 526 labeled "All." Section 526 may include all media programs that match the filter criteria defined in filter area 504. Section 524 may include a subset of the media programs represented in section 526 and that qualify as top-ranked media programs. That is, section 524 may represent a set of top-ranked media programs that have selected from the media programs represented in section 526 based on rankings of the media programs. Section 524 may be designated for promotion of top-ranked media programs within browse view 500.

In certain examples, section 524 may include user interface content (e.g., cover art images) representing a merged set of top-ranked media programs determined by management facility 106 within a context of browse view 500. Accordingly, section 524 may include user interface content representing a blended set of top-ranked media programs that have been selected for inclusion in the merged set of top-ranked based on rankings of the media programs within different media distribution models, which may include any of the media distribution models described herein.

To illustrate, a particular category labeled "New Releases" may be selected as a media program category by which to filter the media programs represented in browse view 500. FIG. 5 illustrates the "New Releases" category to be the selected category in tool 506. In response to a selection of this media program category, user interface facility 108 may populate browse view 500 with user interface content representing only media programs that are new releases. Within this context, management facility 106 may determine a merged set of top-ranked media programs as described herein such that the merged set of top-ranked media programs includes only media programs that are both new releases and top-ranked within any of multiple different media distribution models of the media service 102.

Figure 6:
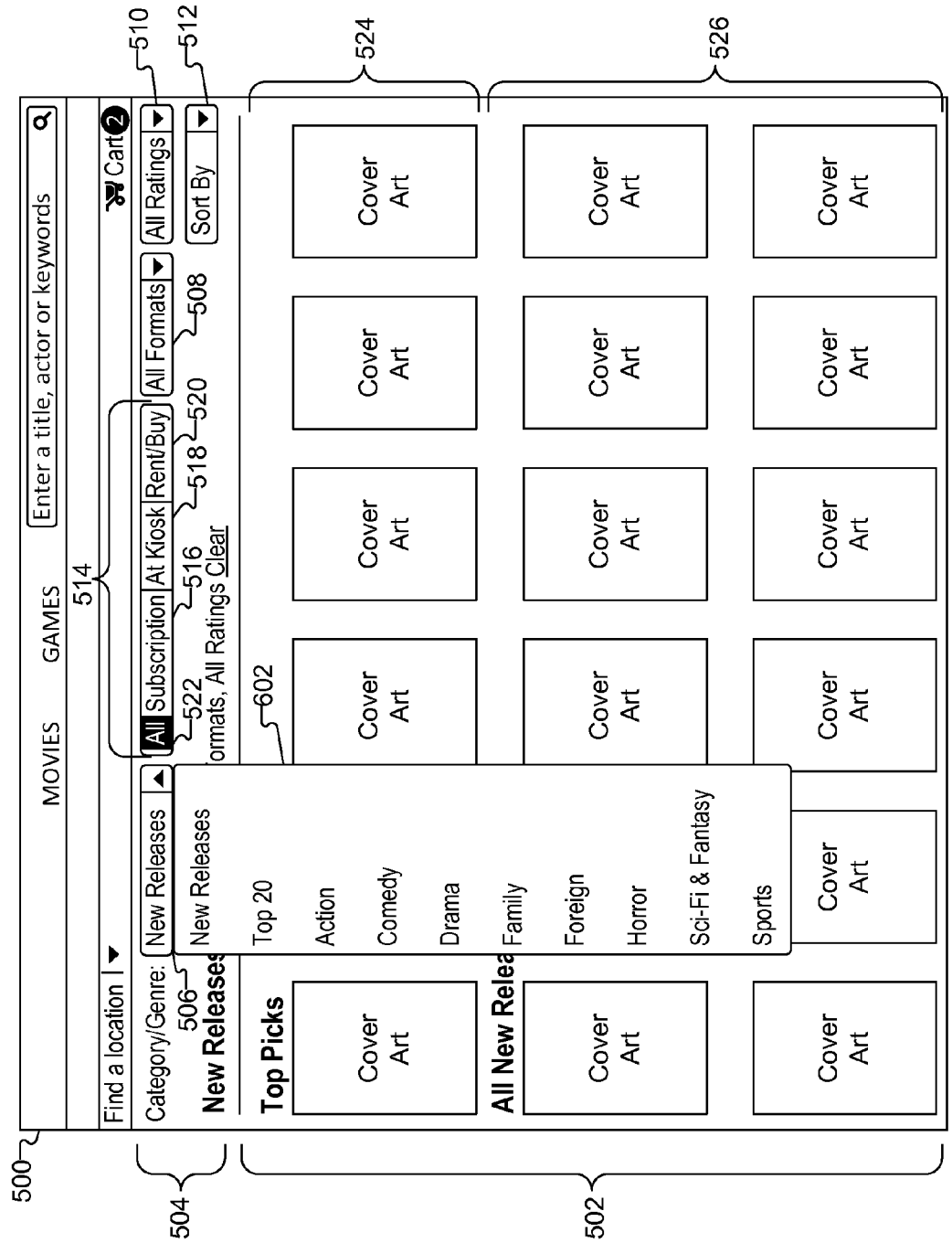

While the browse view 500 shown in FIG. 5 is displayed, a user may select tool 506 to open a drop-down menu of media program categories. FIG. 6 illustrates browse view 500 with a media program category drop-down menu 602 of tool 506 displayed therein. As shown, the drop-down menu 602 may include user selectable categories of media programs. The menu may include any category of media programs, such as a media program theme, a media program genre, a defined collection of curated media programs, and/or any other category of media programs.

A user may select another category from the drop down menu 602. User interface facility 108 may detect the user selection and update browse view 500 based on the newly selected media program category to include only media programs associated with the newly selected category. This may include user interface facility 108 requesting and receiving data representative of another set of top-ranked media programs for inclusion in section 524, the set of top-ranked media programs being generated within the context of the newly selected category by management facility 106 in response to the request from user interface facility 108, such as described herein. For example, if the user selected the "Comedy" genre category from drop-down menu 602, browse view 500 may be updated to include user interface content representing all "Comedy" genre media programs of the media service 102 in section 526 and user interface content representing a set of top-ranked "Comedy" genre media programs in section 524.

As shown in FIG. 6, drop-down menu 602 may include a media program category labeled "Top 20," which may include a set of top-ranked media programs within the media service 102. The set of top-ranked media programs associated with the "Top 20" category may be defined in any suitable way and/or according to any suitable predefined criteria. In certain examples, for instance, the set of top-ranked media programs associated with the "Top 20" category may be a model-specific set of top-ranked media programs or a merged set of top-ranked media programs determined by management facility 106.

In response to a user selection of the "Top 20" category in drop-down menu 602, user interface facility 108 may update the content of browse view 500 to include only media programs in the "Top 20" category. For example, browse view 500 may be updated to include user interface content representing all "Top 20" media programs of the media service 102 in section 526 and user interface content representing a set of top-ranked "Top 20" media programs in section 524 (e.g., the top seven of the "Top 20" media programs).

Figure 7:
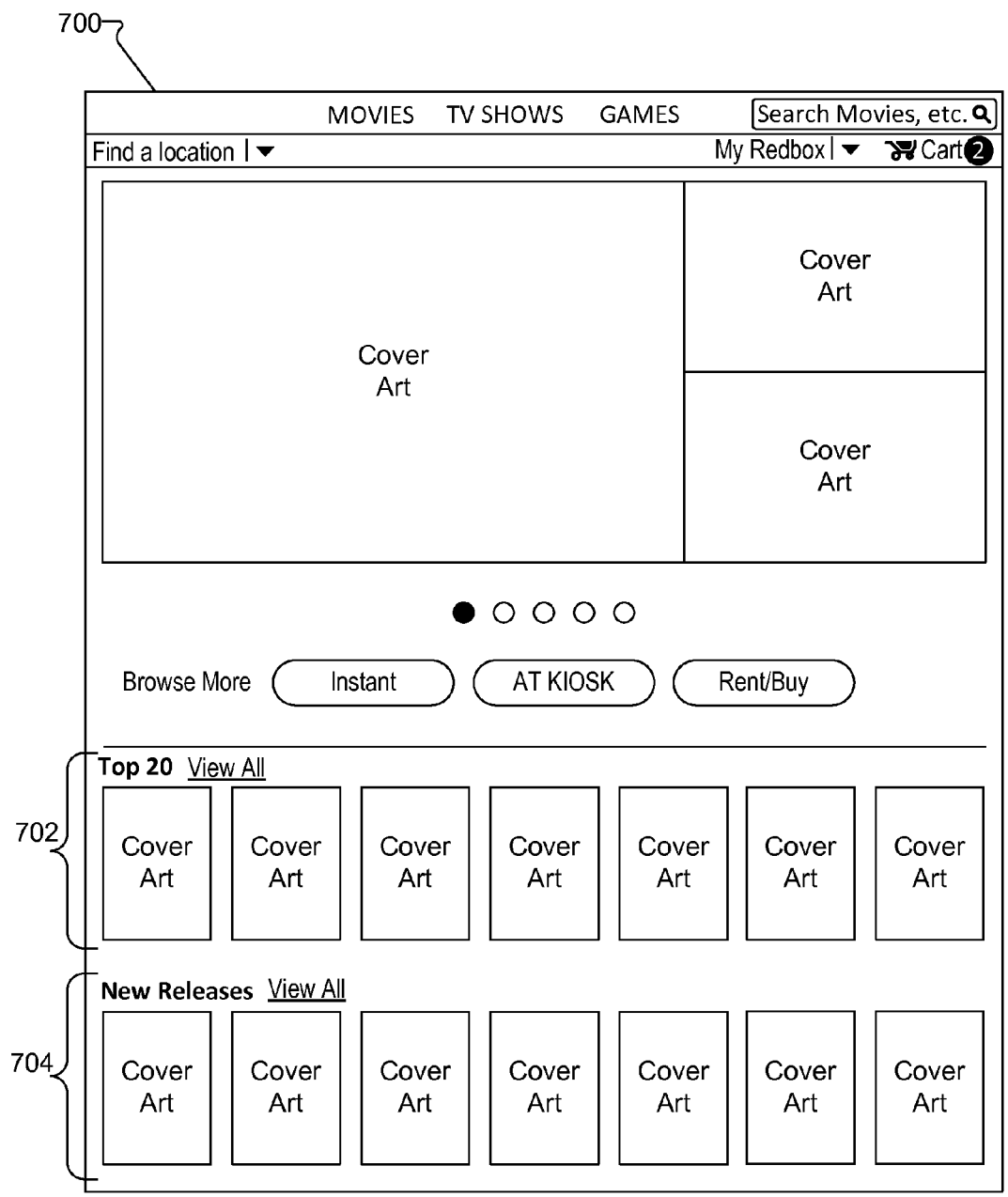

FIG. 7 illustrates a media service launch page GUI view 700 ("launch view 700") of a media service user interface as may be displayed on a display screen. As shown, launch view 700 may include user interface content including a grid of images (e.g., cover art images) that represent select media programs available for access through the media service 102. In certain examples, the user interface content may represent a merged set of top-ranked media programs determined by management facility 106.

For example, launch view 700 may be divided into multiple sections including a top-ranked media programs section 702 labeled "Top 20" and a new releases section 704 labeled "New Releases." In the illustrated example, section 702 may include user interface content representing a "Top 20" category of media programs and section 704 may include user interface content representing a "New Releases" category of media programs. In certain examples, a set of top-ranked media programs associated with the "Top 20" category may be a merged set of top-ranked media programs determined by management facility 106 based on rankings of media programs within multiple different media distribution models as described herein.

FIG. 8 illustrates a media service information view 800 ("information view 800") for a media program as may be displayed on a display screen. As shown, information view 800 may include user interface content related to a specific media program, including information about and options for accessing the media program. In certain examples, the user interface content may represent a merged set of top-ranked media programs determined by management facility 106 within the context of the media program represented in the information view 800.

For example, information view 800 may include a section 802 that includes user interface content representing a set of media programs related to the media program represented in information view 800. In the illustrated example, section 802 is labeled "More Like This" and includes user interface content (e.g., cover art images) representing a set of media programs that share at least one attribute (e.g., media program category, director, producer, etc.) in common with the media program represented in information view 800.

In addition to sharing a common attribute with the media program, the set of media program represented in section 802 may be selected based on rankings of the media programs. Accordingly, the set of media programs represented in section 802 may be a set of top-ranked media programs determined by management facility 106 within the context of the media program represented in the information view 800 (e.g., within the context of shared attributes in common with the media program). Accordingly, the user interface content in section 802 may represent a merged set of top-ranked media programs determined by management facility 106 based on rankings of the media programs within multiple different media distribution models as described herein.

As mentioned, in certain examples, rankings of media programs may be based on user accesses of media programs within the media service and, additionally or alternatively, user ratings of media programs. To this end, user interface facility 108 may provide one or more tools for use by users of the media service 102 to rate media programs. For example, user interface facility 108 may provide a tool for use by a user to assign a number of stars within a five-star scale to a media program. The tool may facilitate ratings in increments of half stars. The tool may be configured to accept any suitable form of input for rating a media program, including predefined user gestures acted out by a user and captured by a video camera device communicatively coupled to system 100.

System 100 may receive and aggregate user ratings for a media program to generate a community rating for the media program. For example, system 100 may receive user ratings associated with multiple different media distribution models (e.g., user ratings associated with user accesses of the media program by way of a digital media distribution model and user ratings associated with user accesses of the media program by way of a physical media distribution model) and may aggregate the user ratings across the different media distribution models to generate a global community rating of the media program for the media service 102. In certain examples, the community ratings of media programs may be used by management facility 106 as at least one factor for determining a set of top-ranked media programs.

Information view 800 may include user interface content indicating a community rating of the media program represented in information view 800. As shown in FIG. 8, for example, information view 800 includes user interface content 804 indicating a star-scale average rating of the media program and a number of user ratings received for the media program.

Figure 9:
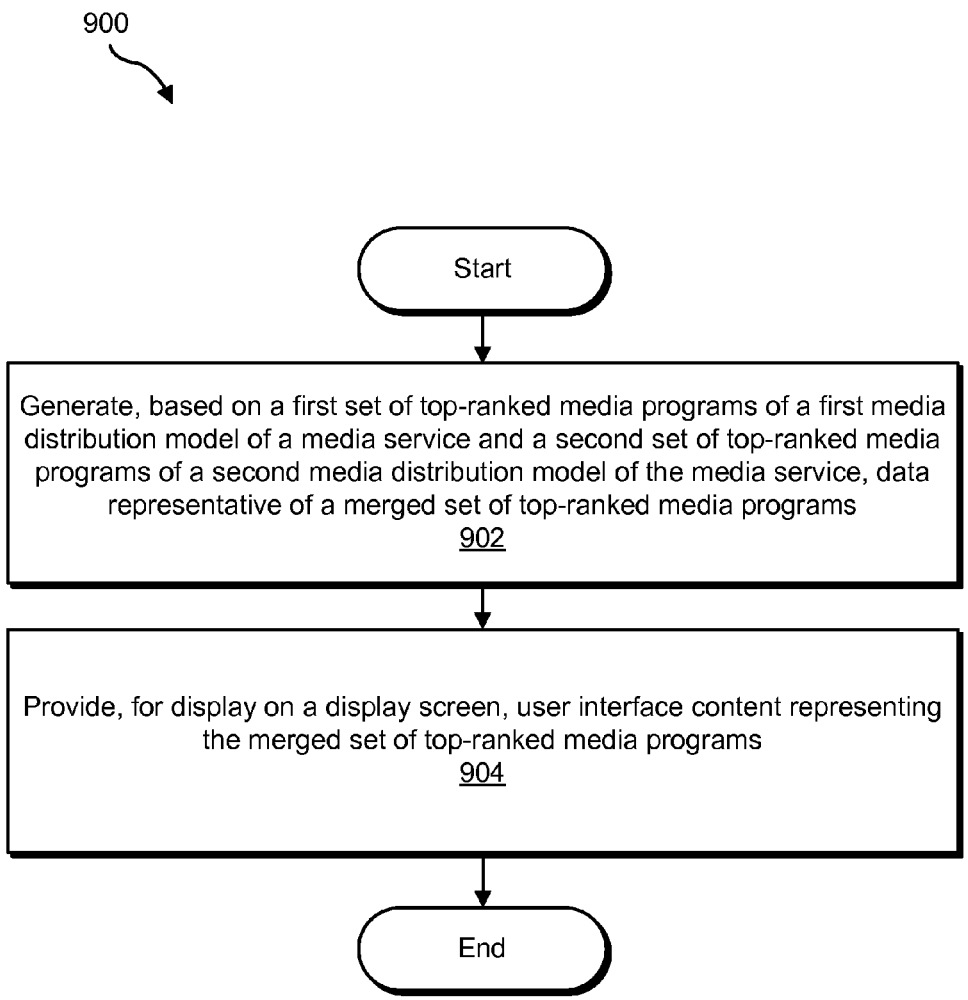
FIG. 9 illustrates an exemplary method of determining and presenting top-ranked media programs according to principles described herein.

FIG. 9 illustrates an exemplary method 900 of determining and presenting top-ranked media programs according to principles described herein. While FIG. 9 illustrates exemplary steps according to certain embodiments, other embodiments may omit, add to, reorder, combine, and/or modify any of the steps shown in FIG. 9. In certain embodiments, one or more of the steps shown in FIG. 9 may be performed by system 100 and/or one or more components or implementations of system 100.

In step 902, a system (e.g., system 100) generates, based on a first set of top-ranked media programs of a first media distribution model of a media service and a second set of top-ranked media programs of a second media distribution model of the media service, data representative of a merged set of top-ranked media programs, such as described herein. The merged set of top-ranked media programs may include at least one media program from the first set of top-ranked media programs and at least one media program from the second set of top-ranked media programs. Accordingly, the merged set of top-ranked media programs may include a blended set of top-ranked media programs that includes media programs based on rankings of the media programs within the first media distribution model and the second media distribution model.

In step 904, the system provides, for display on a display screen, user interface content representing the merged set of top-ranked media programs. Step 904 may be performed in any of the ways described herein, and may include providing the user interface content for inclusion in any of the exemplary media service user interface views described herein or in other GUI views. Step 904 may include the system performing any suitable operation to provide the user interface content for display, such as generating data representative of the user interface content, transmitting data representative of the user interface content to a display device or another device associated with the display device, rendering the user interface content, and/or any other step that provides the user interface content for display on a display screen.

In certain embodiments, one or more of the systems, components, and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 10:
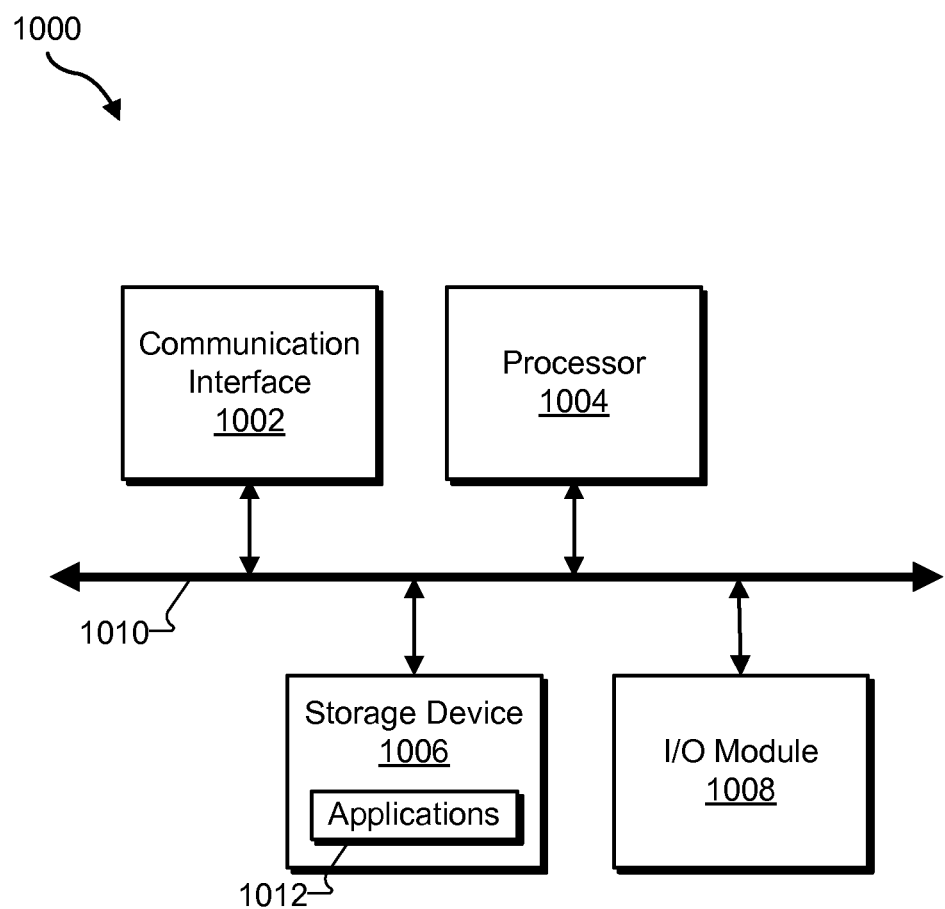
FIG. 10 illustrates an exemplary computing device according to principles described herein.

FIG. 10 illustrates an exemplary computing device 1000 that may be configured to perform one or more of the processes described herein. As shown in FIG. 10, computing device 1000 may include a communication interface 1002, a processor 1004, a storage device 1006, and an input/output ("I/O") module 1008 communicatively connected via a communication infrastructure 1010. While an exemplary computing device 1000 is shown in FIG. 10, the components illustrated in FIG. 10 are not intended to be limiting. Additional or alternative components may be used in other embodiments. Components of computing device 1000 shown in FIG. 10 will now be described in additional detail.

Communication interface 1002 may be configured to communicate with one or more computing devices. Examples of communication interface 1002 include, without limitation, a wired network interface (such as a network interface card), a wireless network interface (such as a wireless network interface card), a modem, and any other suitable interface. Communication interface 1002 may additionally or alternatively provide such a connection through, for example, a local area network (such as an Ethernet network), a personal area network, a telephone or cable network, a satellite data connection, a dedicated URL, an Internet access network, or any other suitable connection. Communication interface 1002 may be configured to interface with any suitable communication media, protocols, and formats.

Processor 1004 generally represents any type or form of processing unit capable of processing data or interpreting, executing, and/or directing execution of one or more of the instructions, processes, and/or operations described herein. Processor 1004 may direct execution of operations in accordance with one or more applications 1012 or other computer-executable instructions such as may be stored in storage device 1006 or another non-transitory computer-readable medium.

Storage device 1006 may include one or more data storage media, devices, or configurations and may employ any type, form, and combination of data storage media and/or device. For example, storage device 1006 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1006. For example, data representative of one or more executable applications 1012 (which may include, but are not limited to, one or more of the software applications described herein) configured to direct processor 1004 to perform any of the operations described herein may be stored within storage device 1006. In some examples, data may be arranged in one or more databases residing within storage device 1006.

I/O module 1008 may be configured to receive user input and provide user output and may include any hardware, firmware, software, or combination thereof supportive of input and output capabilities. For example, I/O module 1008 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1008 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1000. For example, one or more applications 1012 residing within storage device 1006 may be configured to direct processor 1004 to perform one or more processes or functions associated with one or more of the systems and/or facilities described herein. Likewise, any of the storage facilities described herein may be implemented by or within storage device 1006.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
generating, by a media service provider system and based on a first set of most-accessed media programs within a first media distribution model of a media service and a second set of most-accessed media programs within a second media distribution model of the media service, data representative of a merged set of most-accessed media programs that includes at least one media program from the first set of most-accessed media programs and at least one media program from the second set of most-accessed media programs; and
providing, by the media service provider system for display in a media browse view of a media service user interface on a display screen, user interface content representing the merged set of most-accessed media programs, the media browse view including a distribution model filter tool having a plurality of user-selectable options corresponding to different media distribution models; wherein
the first media distribution model comprises a digital media distribution model that utilizes a digital media distribution channel, and the second media distribution model comprises a physical media distribution model that utilizes a physical media distribution channel that includes distributing physical copies of media programs to a user,
the media browse view includes a plurality of rows of user interface content representing media programs,
the providing of the user interface content representing the merged set of most-accessed media programs for display within the media browse view of the media service user interface comprises providing the user interface content representing the merged set of most-accessed media programs for display as a blended set of most-accessed media programs within a single row included in the plurality of rows, the blended set of most-accessed media programs including one or more media programs accessible through the digital media distribution channel utilized by the digital media distribution model and one or more media programs accessible through the physical media distribution channel utilized by the physical media distribution model,
each item of user interface content represented in the blended set of most-accessed media programs within the single row represents a single media program, and
the providing of the user interface content further includes prioritizing, based on a distribution model attribute of each media program included in the blended set of most-accessed media programs, display of the user interface content representative of the one or more media programs accessible through the physical media distribution channel within the single row over display of the user interface content representative of the one or more media programs accessible through the digital media distribution channel within the single row.

2. The method of claim 1, wherein:
the generating of the data representative of the merged set of most-accessed media programs is further based a third set of most-accessed media programs within a third media distribution model of the media service;
the merged set of most-accessed media programs includes at least one media program from the third set of most-accessed media programs; and
the third media distribution model comprises an additional digital media distribution model that utilizes the digital media distribution channel.

3. The method of claim 2, wherein:
the digital media distribution model that utilizes the digital media distribution channel comprises a digital subscription-based media distribution model; and
the additional digital media distribution model that utilizes the digital media distribution channel comprises a digital transactional-based media distribution model.

4. The method of claim 1, wherein the generating of the merged most-accessed set of media programs comprises non-comprehensively merging the first set of most-accessed media programs and the second set of most-accessed media programs based on a predefined merge heuristic.

5. The method of claim 1, wherein:
the media browse view is filtered by a media program category; and
the merged set of most-accessed media programs includes only media programs associated with the media program category.

6. The method of claim 5, wherein the providing of the user interface content representing the merged set of most-accessed media programs for display within the media browse view of the media service user interface further comprises providing the user interface content representing the merged set of most-accessed media programs for display within a section of the media browse view designated for promotion of most-accessed media programs within the media program category.

7. The method of claim 1, embodied as computer-executable instructions on at least one non-transitory computer-readable medium.

8. A method comprising:
generating, by a media service provider system and based on a first set of most-accessed media programs within a first media distribution model of a media service and a second set of most-accessed media programs of a second media distribution model of the media service, data representative of a merged set of most-accessed media programs that includes at least one media program from the first set of most-accessed media programs and at least one media program from the second set of most-accessed media programs; and providing, by the media service provider system for display in a media browse view of a media service user interface on a display screen, user interface content representing the merged set of most-accessed media programs, the media browse view including a distribution model filter tool having a plurality of user-selectable options corresponding to different media distribution models; wherein the first media distribution model comprises a digital media distribution model that utilizes a digital media distribution channel, and the second media distribution model comprises a physical media distribution model that utilizes a physical media distribution channel that includes distributing physical copies of media programs to a user, the media browse view includes a plurality of rows of user interface content representing media programs, the providing of the user interface content representing the merged set of most-accessed media programs for display within the media browse view of the media service user interface comprises providing the user interface content representing the merged set of most-accessed media programs for display as a blended set of most-accessed media programs within a single row included in the plurality of rows, the blended set of most-accessed media programs including one or more media programs accessible through the digital media distribution channel utilized by the digital media distribution model and one or more media programs accessible through the physical media distribution channel utilized by the physical media distribution model, the providing of the user interface content further includes prioritizing, based on a distribution model attribute of each media program included in the blended set of most-accessed media programs, display of the user interface content representative of the one or more media programs accessible through the physical media distribution channel within the single row over display of the user interface content representative of the one or more media programs accessible through the digital media distribution channel within the single row.

9. The method of claim 8, wherein the generating of the merged most-accessed set of media programs comprises non-comprehensively merging the first set of most-accessed media programs and the second set of most-accessed media programs based on a predefined merge heuristic.

10. The method of claim 8, embodied as computer-executable instructions on at least one non-transitory computer-readable medium.

11. A system comprising:
at least one physical computing device that includes:
a top media programs management facility that generates, based on a first set of most-accessed media programs of a first media distribution model of a media service and a second set of most-accessed media programs of a second media distribution model of the media service, data representative of a merged set of most-accessed media programs that includes at least one media program from the first set of most-accessed media programs and at least one media program from the second set of most-accessed media programs; and
a user interface facility that provides, for display within a media browse view of a media service user interface on a display screen, user interface content representing the merged set of most-accessed media programs, the media browse view including a distribution model filter tool having a plurality of user-selectable options corresponding to different media distribution models; wherein the first media distribution model comprises a digital media distribution model that utilizes a digital media distribution channel, and the second media distribution model comprises a physical media distribution model that utilizes a physical media distribution channel that includes distributing physical copies of media programs to a user, the media browse view includes a plurality of rows of user interface content representing media programs, the user interface facility provides the user interface content representing the merged set of most-accessed media programs for display within the media browse view of the media service user interface by providing the user interface content representing the merged set of most-accessed media programs for display as a blended set of most-accessed media programs within a single row included in the plurality of rows, the blended set of most-accessed media programs including one or more media programs accessible through the digital media distribution channel utilized by the digital media distribution model and one or more media programs accessible through the physical media distribution channel utilized by the physical media distribution model, each item of user interface content represented in the blended set of most-accessed media programs within the single row represents a single media program, and the user interface facility further provides the user interface content for display by prioritizing, based on a distribution model attribute of each media program included in the blended set of most-accessed media programs, display of the user interface content representative of the one or more media programs accessible through the physical media distribution channel within the single row over display of the user interface content representative of the one or more media programs accessible through the digital media distribution channel within the single row.

12. The method of claim 11, wherein:
the generating of the data representative of the merged set of most-accessed media programs is further based a third set of most-accessed media programs within a third media distribution model of the media service;
the merged set of most-accessed media programs includes at least one media program from the third set of most-accessed media programs; and
the third media distribution model comprises an additional digital media distribution model that utilizes the digital media distribution channel.

13. The method of claim 12, wherein:
the digital media distribution model that utilizes the digital media distribution channel comprises a digital subscription-based media distribution model; and
the additional digital media distribution model that utilizes the digital media distribution channel comprises a digital transactional-based media distribution model.

14. The system of claim 11, wherein the top media programs management facility that generates the merged most-accessed set of media programs by non-comprehensively merging the first set of most-accessed media programs and the second set of most-accessed media programs based on a predefined merge heuristic.

15. The system of claim 11, wherein the user interface facility further provides the user interface content for display on the display screen by providing the user interface content representing the merged set of most-accessed media programs for display within the media browse view filtered by a media program category.

16. The method of claim 1, wherein the single row corresponds to a top row included in the plurality of rows.

* * * * *